United States Patent

Aral et al.

(10) Patent No.: US 8,116,977 B2
(45) Date of Patent: Feb. 14, 2012

(54) AUTOMATIC CONTROL OF PASSIVE, TOWED IMPLEMENTS

(75) Inventors: Gurcan Aral, Cupertino, CA (US); John W Peake, Mountain View, CA (US); Brad A Stronger, Santa Clara, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 12/868,626

(22) Filed: Aug. 25, 2010

(65) Prior Publication Data

US 2010/0324772 A1    Dec. 23, 2010

Related U.S. Application Data

(63) Continuation-in-part of application No. 12/244,198, filed on Oct. 2, 2008.

(51) Int. Cl.
*G01C 21/00* (2006.01)

(52) U.S. Cl. .......................... 701/214; 701/50

(58) Field of Classification Search ............. 701/50, 701/54, 214
See application file for complete search history.

(56) References Cited

U.S. PATENT DOCUMENTS

| | | | |
|---|---|---|---|
| 3,141,982 A * | 7/1964 | Smith | 307/149 |
| 5,717,593 A | 2/1998 | Gvili | |
| 5,928,309 A | 7/1999 | Korver | |
| 5,987,383 A | 11/1999 | Keller | |
| 6,076,612 A * | 6/2000 | Carr et al. | 172/7 |
| 6,434,462 B1 * | 8/2002 | Bevly et al. | 701/50 |
| 6,666,279 B2 * | 12/2003 | Scarlett et al. | 172/1 |
| 6,804,587 B1 * | 10/2004 | O Connor et al. | 701/26 |
| 7,054,731 B1 | 5/2006 | Lange | |
| 7,065,440 B2 * | 6/2006 | Aral | 701/50 |
| 7,142,956 B2 * | 11/2006 | Heiniger et al. | 701/23 |
| 7,188,015 B2 | 3/2007 | Lange | |
| 7,225,891 B2 * | 6/2007 | Gehring et al. | 180/14.2 |
| 7,263,422 B2 | 8/2007 | Lange | |
| 7,373,231 B2 * | 5/2008 | McClure et al. | 701/50 |
| 7,383,114 B1 * | 6/2008 | Lange et al. | 701/50 |
| 7,689,354 B2 * | 3/2010 | Heiniger et al. | 701/213 |
| 7,835,832 B2 * | 11/2010 | Macdonald et al. | 701/24 |
| 7,885,745 B2 * | 2/2011 | McClure et al. | 701/50 |
| 2002/0165669 A1 * | 11/2002 | Pinto et al. | 701/213 |
| 2006/0282205 A1 * | 12/2006 | Lange | 701/50 |
| 2008/0269988 A1 * | 10/2008 | Feller et al. | 701/41 |
| 2009/0326763 A1 * | 12/2009 | Rekow | 701/42 |

* cited by examiner

*Primary Examiner* — James Trammell
*Assistant Examiner* — Truc M Do
(74) *Attorney, Agent, or Firm* — NUPAT, LLC; Morrison Ulman (57) ABSTRACT

An automatic control system for passive, towed implements is described. The system provides a strategy for optimal control of a towed implement using a nudge input to an autopilot-controlled tractor. Implement path-tracking error, as measured by a GNSS receiver, is consistently corrected to zero.

10 Claims, 9 Drawing Sheets

Fig. 4 step pulse sinusoid, $f_1$ sinusoid, $f_2$ pseudorandom

AUTOMATIC CONTROL OF PASSIVE, TOWED IMPLEMENTS

RELATED APPLICATIONS

This application is a continuation-in-part of U.S. patent application Ser. No. 12/244,198, "Automatic Control of Passive, Towed Implements", filed on 2 Oct. 2008 and incorporated herein by reference.

TECHNICAL FIELD

The disclosure is related to the control of passive, towed implements for applications such as precision farming.

BACKGROUND

Farmers in the United States operate over 2 million farms covering roughly one billion acres of land and producing hundreds of billions of dollars of crops each year. The farmers spend tens of billions of dollars per year on seeds, fertilizer, chemicals and fuel. A modern farm is a complex operation where precision and efficiency can have a significant impact on the bottom line. According to the USDA, the most efficient 25% of US corn growers spend about $1 to grow a bushel of corn while growers in the least efficient 25% spend $3 to grow the same amount.

One way farmers improve efficiency is by avoiding unnecessary overlaps in tilling, spraying and harvesting operations. In other words, they avoid driving their tractors and equipment over the same area twice. Consider an 80-acre field and a 44-foot wide sprayer towed behind a tractor as an example. The sprayer is towed across the field in series of overlapping tracks. If the overlap between adjacent sprayer tracks is reduced from two feet to four inches, four acres of spraying are eliminated. Such precision may be achieved by guiding tractors with global positioning system (GPS) based steering systems.

Precision control of passive, towed farm implements such as plows, rippers, disks, planters, applicators, drills and other equipment has other benefits as well. It makes it easier to operate machinery in dark or dusty conditions. Operators can drive faster and reduce driving stress. The quantity of fuel and chemicals used can be decreased, thereby saving money and the environment. Soil compaction can be avoided by keeping heavy equipment on precise tracks.

Advances in GPS technology (and systems based on other global navigational satellite systems (GNSS) such as the Russian GLONASS and the European GALILEO) have made it possible to drive large farm tractors along predetermined paths very accurately. A tractor can return to a field a year after first working it and follow the same track within an inch. The accuracy of a passive, towed implement is not as good, however.

A passive, towed implement does not have its own steering actuators. It is attached to a tractor by a hitch and the tractor pulls it across the ground. The implement may wander off its intended path for any number of reasons including asymmetrical loading (e.g. tougher ground to plow on one side than the other) or drag due to operating on a slope. Skilled tractor operators can compensate for a wandering implement by deliberately steering the tractor away from a desired path so that the implement stays on the path even though the tractor does not. However, despite the best efforts of operators, this manual method is imprecise, takes a long time and travel distance, and causes operator fatigue. It would be better if this "steering away" technique were automated and made more precise.

Modern tractors are often equipped with GPS (or, more generally, GNSS) based autopilot systems. These systems are capable of driving a tractor along a desired path with high accuracy. Further, it is common for such systems to accept offset commands. For example, one may command the system to drive the tractor a specific number of inches left or right of the programmed path. The tractor then travels parallel to, but offset from, the programmed path. Such lateral offsets are called "nudges".

A wide variety of tractor and autopilot systems are available from different manufacturers. Each of these uses its own control strategy and implementation. The competitiveness of the market ensures that the majority of tractor-autopilot combinations offer path tracking accuracy and response to nudge commands that fall within a relatively narrow range of parameters. Nonetheless, small differences between tractor-autopilot system responses can affect the performance of passive-implement control systems.

What is needed is a control system that ensures that passive, towed implements follow their intended path and correct deviations from the path as quickly as possible. The system should operate in concert with an autopilot-controlled tractor and include a way to measure the tractor-autopilot system response. Such a system would automate the tiring, tedious task of steering a tractor intentionally off path so as to keep an implement on path and improve the accuracy of the actual path followed by the implement.

DETAILED DESCRIPTION

A control system for passive implements is now described. The system forces a passive, towed implement onto a desired path by directing an autopilot-controlled tractor optimally off the path. The system decreases the response time required for an implement to execute a nudge offset from a predetermined path. The control system calibrates its internal tractor model by measuring the response of the autopilot-controlled tractor to known inputs.

A passive, towed implement's path may wander off course from a desired path for any number of reasons including uneven load on the implement, sloping ground, or random disturbances. One of the tasks of the control system described herein is to minimize implement deviations from a desired path by speeding up the response of an implement to nudge commands.

Figure 1:
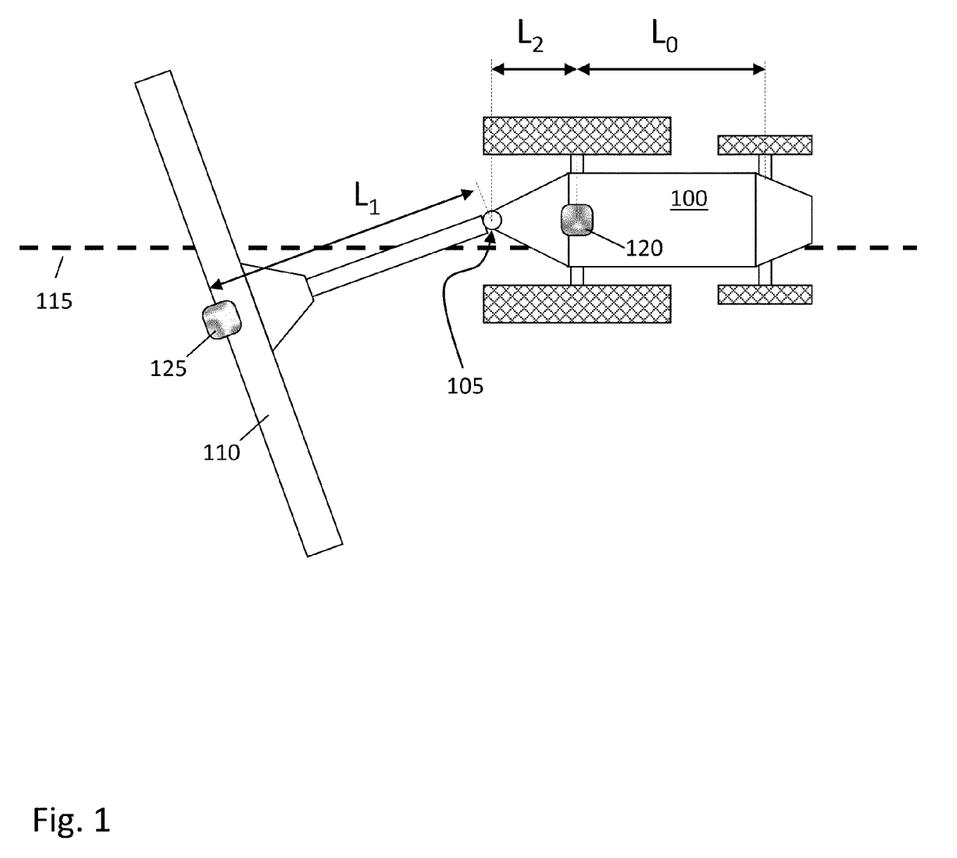
FIG. 1 illustrates a tractor with a hitch towing a passive implement along a desired path.

FIG. 1 illustrates a tractor with a hitch towing a passive implement along a desired path. Tractor 100 includes hitch point 105 to which passive, towed implement 110 is attached. Dashed line 115 indicates the desired path along which the tractor and implement are to move. Note that in FIG. 1 neither the tractor nor the implement are on the desired path; rather they are maneuvering in an attempt to return to the path. The position of tractor 100, as represented by a reference point at the midpoint of the tractor's rear axle, is measured by a GNSS receiver connected to antenna 120. Similarly, the position of passive, towed implement 110 is measured by a GNSS receiver connected to antenna 125 which is located at a reference point on the implement $L_1$ away from the hitch point. The tractor's wheelbase is $L_0$ and the hitch point is located a distance, $L_2$, behind the midpoint of the tractor's rear axle. The location of the antenna on the implement is the point that is controlled; i.e. the point that is made to follow a desired implement path. (Of course, other points on the implement may be controlled instead.)

When the tractor changes heading to move to a new offset, the hitch point initially moves in the opposite direction. This reverse reaction may be modeled by closed form geometric relationships. For example the offset of the hitch point from a desired path is related to the offset of the tractor by: $x_h = x_t - L_2 \sin \psi$ where $x_h$ is the hitch point offset, $x_t$ is the tractor offset, and $\psi$ is the tractor heading.

The GNSS receivers used to measure the position of the tractor and the implement may take advantage of corrections such as those provided by satellite or ground based augmentation systems (SBAS or GBAS). Examples of SBAS include the Federal Aviation Administration's Wide Area Augmentation System (FAA WAAS), the European Geostationary Navigation Overlay Service (EGNOS) operated by the European Space Agency, the Multi-functional Satellite Augmentation System (MSAS) operated by Japan's Ministry of Land, Infrastructure and Transport; and various proprietary systems operated by commercial enterprises. Examples of GBAS include the United States' Local Area Augmentation System (LAAS) and various European differential GPS networks. Even greater accuracy can be achieved by measuring GNSS carrier phase using so-called real time kinematic (RTK) techniques involving a nearby base station located at a surveyed position. RTK allows centimeter-level positioning, for example.

The advanced control system described herein does not depend on detailed knowledge of the tractor autopilot. However, the control system includes the ability to measure the response of the autopilot-controlled tractor to known inputs. Information from response measurements is included in the control system's tractor model.

Figure 2:
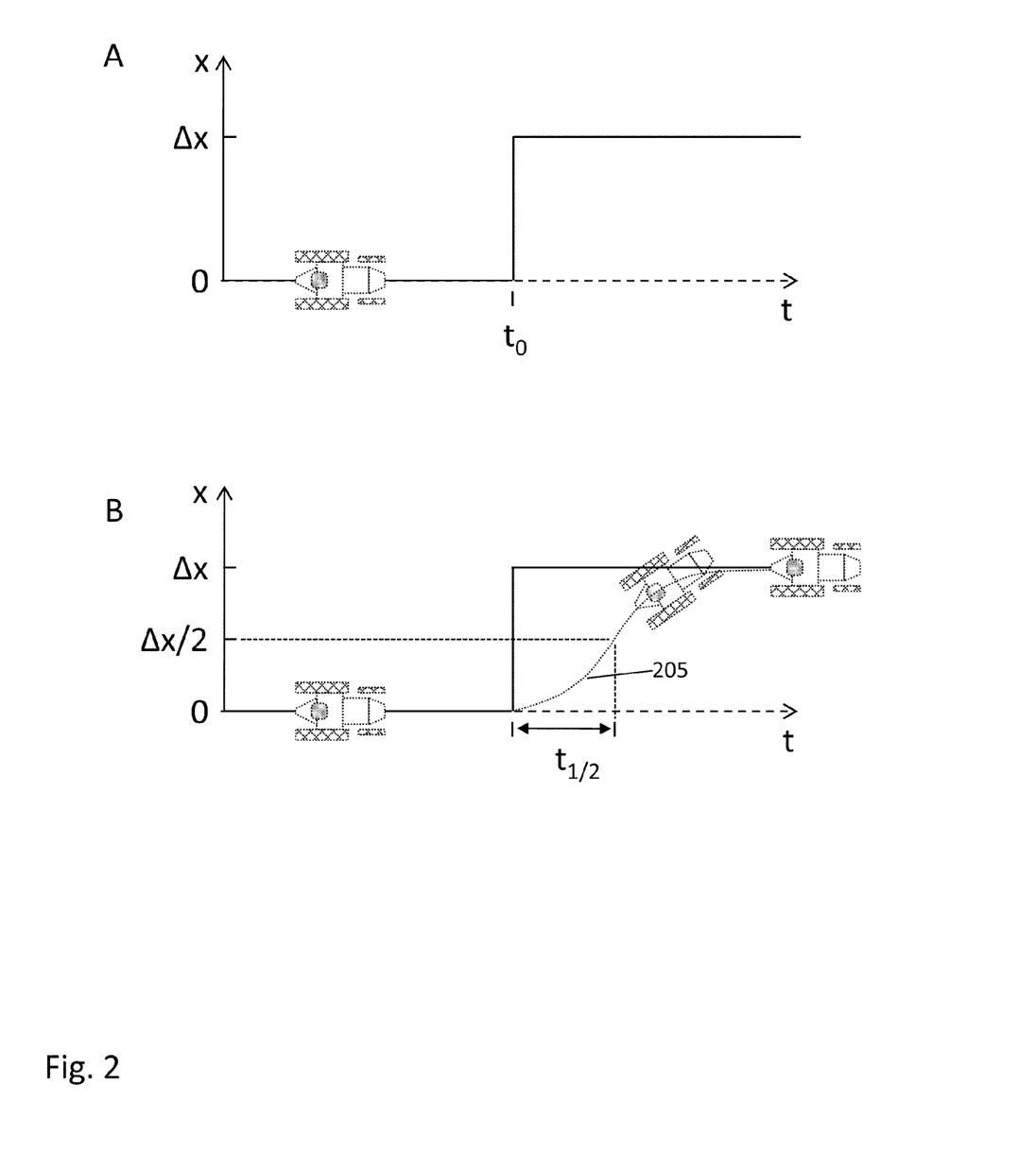
FIG. 2A illustrates a step-offset input to a tractor autopilot.
FIG. 2B illustrates the tractor response to the input of FIG. 2A including the time, $t_{1/2}$, required for the tractor to achieve half the requested offset.

FIGS. 2A and 2B present a simple example of measuring the response of an autopilot-controlled tractor. FIG. 2A illustrates a step-offset input to a tractor autopilot; FIG. 2B illustrates the tractor response to the input of FIG. 2A including the time, $t_{1/2}$, required for the tractor to achieve half the requested offset. In FIG. 2A a graph of requested offset (from a desired path) versus time changes abruptly from zero to $\Delta x$ at time $t_0$. FIG. 2B shows the results of this request. The tractor is unable to execute the requested, instantaneous, step offset. Its actual trajectory is represented by dotted line 205. In a simple tractor model, it is not necessary to evaluate the shape of the tractor response represented by dotted line 205. Rather, the time, $t_{1/2}$, required for the tractor to achieve half the requested offset is the only parameter recorded. More advanced techniques for measuring an autopilot-controlled tractor's response are discussed below.

Given a model for the tractor's dynamics, and having characterized the geometrical parameters of the tractor, hitch and implement, one may design a feedback control model for steering the tractor. For example, tractor motion for small deviations from a desired path may be described by:

$$\dot{\psi} = \frac{V}{L}\theta$$
$$\dot{x} = V\psi$$

where V and L are the tractor's speed and wheelbase respectively and $\psi$ is the tractor's heading. $\theta$ is the tractor's steering angle; i.e. the angle of the front wheels away from straight ahead. x is the lateral offset from the desired path. A conventional feedback system may be designed to control a tractor that obeys these equations. When a nudge is introduced to provide a step change in path offset error, the feedback control system changes the tractor's steering angle to make the tractor execute the nudge.

An advanced control system for a passive, towed implement is now described in more detail. The system employs an architecture that is analogous to the Smith predictor introduced in 1957 by O. J. M. Smith. A Smith predictor is most often used in scenarios where a process to be controlled is followed by a delay which prevents immediate measurement of a process value of interest. When a process value of interest is measured after a delay, any actuation to affect the dynamic behavior of the process arrives too late to be used effectively. The Smith predictor circumvents this problem by driving a model of the process and a model of the delay with the same actuation value as applied to the actual process. If the models are accurate, the Smith predictor provides estimated values of otherwise inaccessible immediate process values. It also provides an estimated value of the delayed measurement. The estimated immediate process values are used to modify the dynamic behavior of the process (for example to achieve a faster response) and the estimated delayed process value is compared to the actual delayed measurement. The difference detected in this comparison is used to compensate for process disturbances.

Although the Smith predictor is most often thought of in terms of a process followed by a delay, other dynamic process may be substituted for the delay. In the classic delay scenario, the Smith predictor allows a control system to operate on a process of interest while leaving the delay undisturbed. Here, the Smith predictor is used to control a passive, towed implement while leaving a tractor autopilot system undisturbed.

Figure 3:
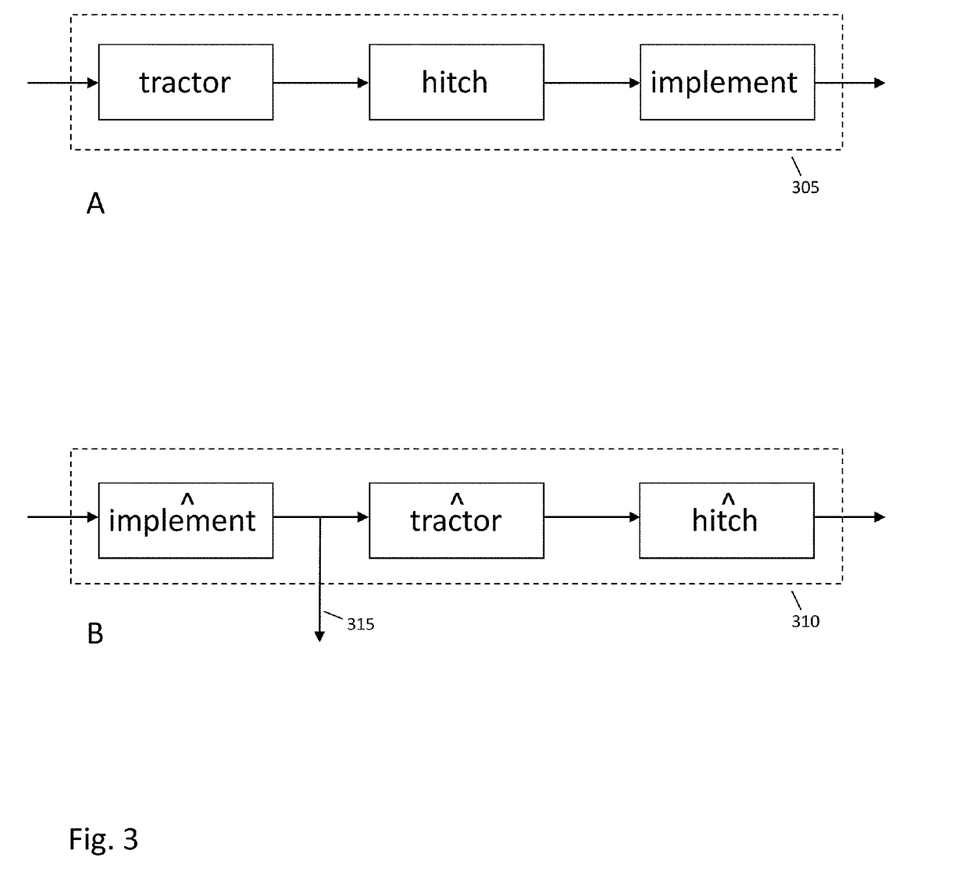
FIG. 3A shows a conventional model for a tractor-hitch-implement system.
FIG. 3B shows a model for a fictitious tractor-hitch-implement system in which the order of subsystems has been changed compared to the real world system.

FIG. 3A shows a conventional model for a tractor-hitch-implement system. Input to the system is made by sending nudge commands to the tractor autopilot (labeled "tractor" in the figure). The output from the system is the position of the implement as measured by its GNSS receiver. In order to control the implement using the conventional model of FIG. 3A, detailed knowledge of the tractor autopilot is required. However, the values of internal process variables, i.e. those inside dashed box 305, are often not known. They depend on details of the tractor autopilot which are proprietary to its manufacturer.

The model of FIG. 3A is a single-input-single-output linear system. Therefore its internal elements may be rearranged without affecting its input-output behavior. Such a rearrangement is shown in FIG. 3B. FIG. 3B shows a model for a fictitious tractor-hitch-implement system in which the order of elements has been changed compared to the real world system. In FIG. 3B a model of the implement precedes models of the tractor and the hitch. (The tractor and hitch elements could also be reordered.)

Keeping in mind the Smith predictor, one may view the model of FIG. 3B as including a process to be controlled—the implement- and a process to leave undisturbed—the tractor and hitch. In FIG. 3B, however, values of internal process variables (i.e. inside dashed box 310) are estimated by the implement, tractor and hitch models. In particular, estimates of fictitious implement error are available at intermediate output 315.

Figure 4:
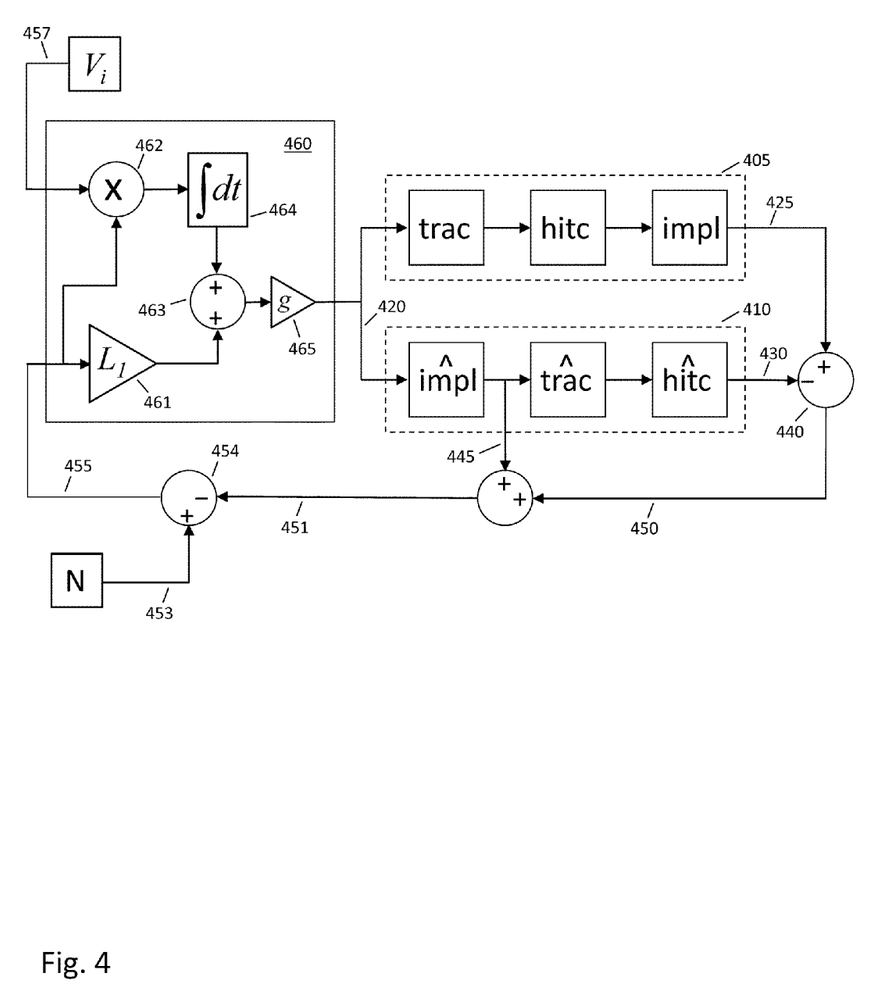
FIG. 4 shows an advanced control system for a passive, towed implement using a control strategy analogous to a Smith predictor.

FIG. 4 shows an advanced control system for a passive, towed implement using a control strategy analogous to a Smith predictor. In FIG. 4, control module 460 sends a nudge command signal to an actual tractor-hitch-implement system 405 (i.e. an autopilot-controlled tractor towing a passive implement attached to the tractor hitch) and to an implement-tractor-hitch model 410. The output 425 of the actual system is the offset of the implement as measured by the implement's GNSS receiver. The output 430 of the model system is an estimate of the offset of the implement. The difference between outputs 425 and 430 is determined by comparator 440 and its output 450 is summed with the estimated immediate implement offset 445 from the implement-tractor-hitch model 410. The summed offset 451 is changed in sign and added to an optional operator's implement nudge 453 in comparator 454. (Operator's implement nudge 453 is zero unless the operator decides that he would like to offset the implement from its desired path.) Finally error signal 455 is fed to control module 460. The speed 457 of the implement, $V_i$, is also input to control module 460. Speed 457 may be determined by the GNSS receiver mounted on the implement.

The design of FIG. 4 controls the implement's dynamics, rather than those of the tractor and its hitch, to improve implement path-tracking response. The dynamics of the tractor and its hitch are left undisturbed in analogy to the delay in a classic Smith predictor. The only actual process variables that are measured are the implement position and speed, obtained by GNSS, and the only input to the system is a series of nudge commands 420 to the tractor autopilot.

The design of FIG. 4 comprises two feedback loops: one including signal path 430, the "outer loop", and the other including signal path 445 the "inner loop". The inner loop controls the implement's dynamics directly while the outer loop corrects mismatches between the actual and model tractor-hitch-implement systems. The estimated immediate implement offset 445 is used to modify the dynamic behavior of the implement to achieve a faster implement response and the estimated delayed implement offset 430 is compared to the actual implement offset 425. The difference detected in this comparison is used to compensate for process disturbances and drifts.

Within actual tractor-hitch-implement system 405, "trac", "hitc", and "impl" refer to the tractor, hitch and implement respectively. In this actual system nudge commands 420 from control module 460 are directed to the tractor's autopilot system. Movement of the tractor affects movement of the hitch and movement of the towed implement attached to the hitch. Within implement-tractor-hitch model 410, "$\widehat{impl}$", "$\widehat{trac}$", and "$\widehat{hitc}$" refer to mathematical models of the implement, autopilot-controlled tractor and hitch respectively. These models take into account the geometric relationships between the actual tractor, implement and hitch parameterized by lengths $L_0$, $L_1$, and $L_2$ described earlier. Methods for modeling the response of the autopilot-controlled tractor include 2nd, 3rd or higher order transfer functions and other techniques discussed below.

The reordering of elements in the model ($\widehat{impl}\rightarrow\widehat{trac}\rightarrow\widehat{hitc}$ versus trac→hitc→impl) means that in model 410 nudge commands are applied directly to the implement and an immediate estimate of implement error is available for feedback to control module 460. However, the overall response of the reordered model elements is the same as it would be if they were arranged in the order of the actual system since the system is linear. Thus the Smith predictor approach allows the implement to be controlled directly.

Within control module 460 error signal 455 is fed to amplifier 461 and multiplier 462. Implement speed 457 is also fed to multiplier 462. The output of the multiplier is fed to discrete-time integrator 464. The outputs of the integrator and of amplifier 461 are summed in adder 463 and fed to amplifier 465. The output of amplifier 465 is nudge signal 420. The gain of amplifier 461 is proportional to the length $L_1$ between the implement hitch point and the implement reference point; i.e. the location of the implement's GNSS receiver. More simply, $L_1$ is the implement boom length. The gain of amplifier 465 is a tuning parameter.

In operation, control module 460 drives error 455 to zero by sending nudge commands to the tractor autopilot within the actual tractor-hitch-implement system 405. Error 455 is composed of immediate implement error 445 (inner loop) and the error (outer loop) or drift between the model 410 of the overall system and the actual system 405. The control module also takes implement speed 457 into account.

Figure 5:
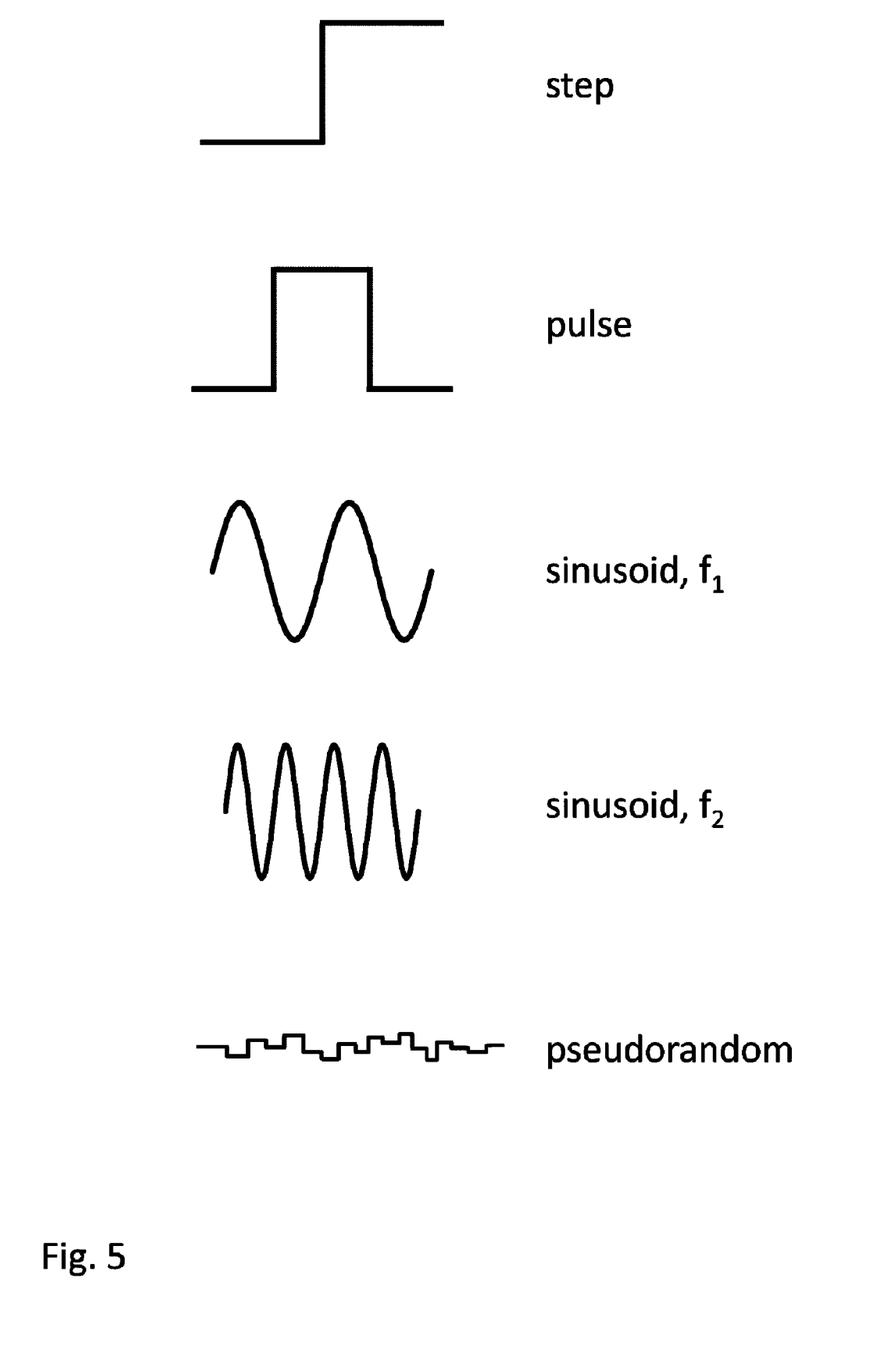
FIG. 5 illustrates examples of step, pulse, sinusoid and pseudorandom inputs to a tractor autopilot.
Figure 6:
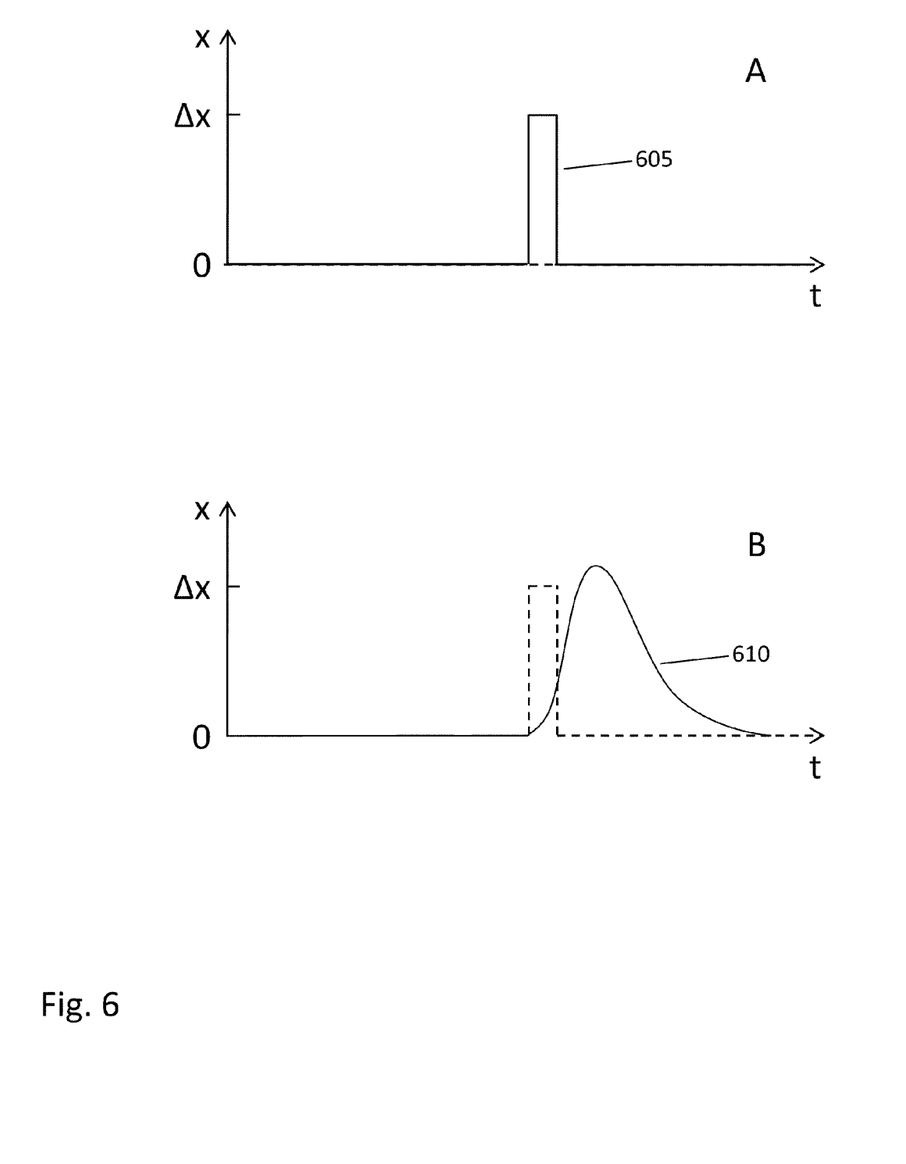
FIG. 6A illustrates a pulse input to a tractor autopilot.
FIG. 6B illustrates the tractor response to the input of FIG. 6A.
Figure 7:
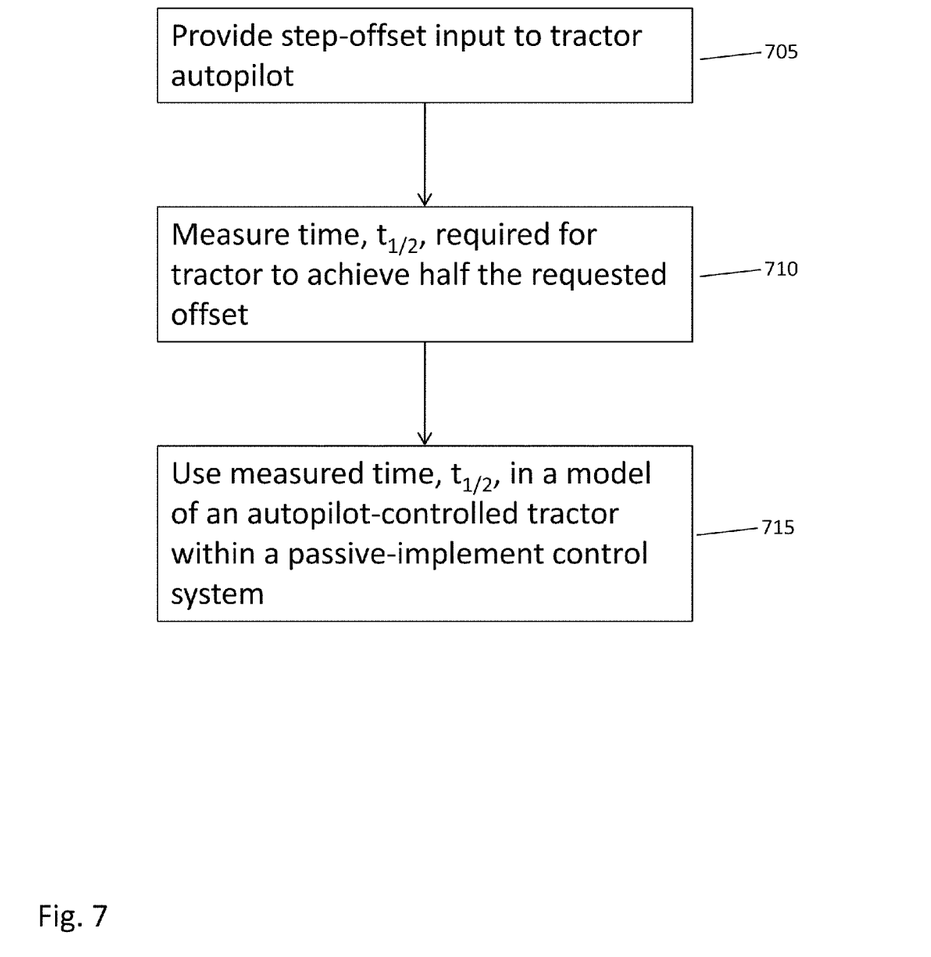
FIG. 7 is a flow chart for a method for guiding a passive implement.
Figure 8:
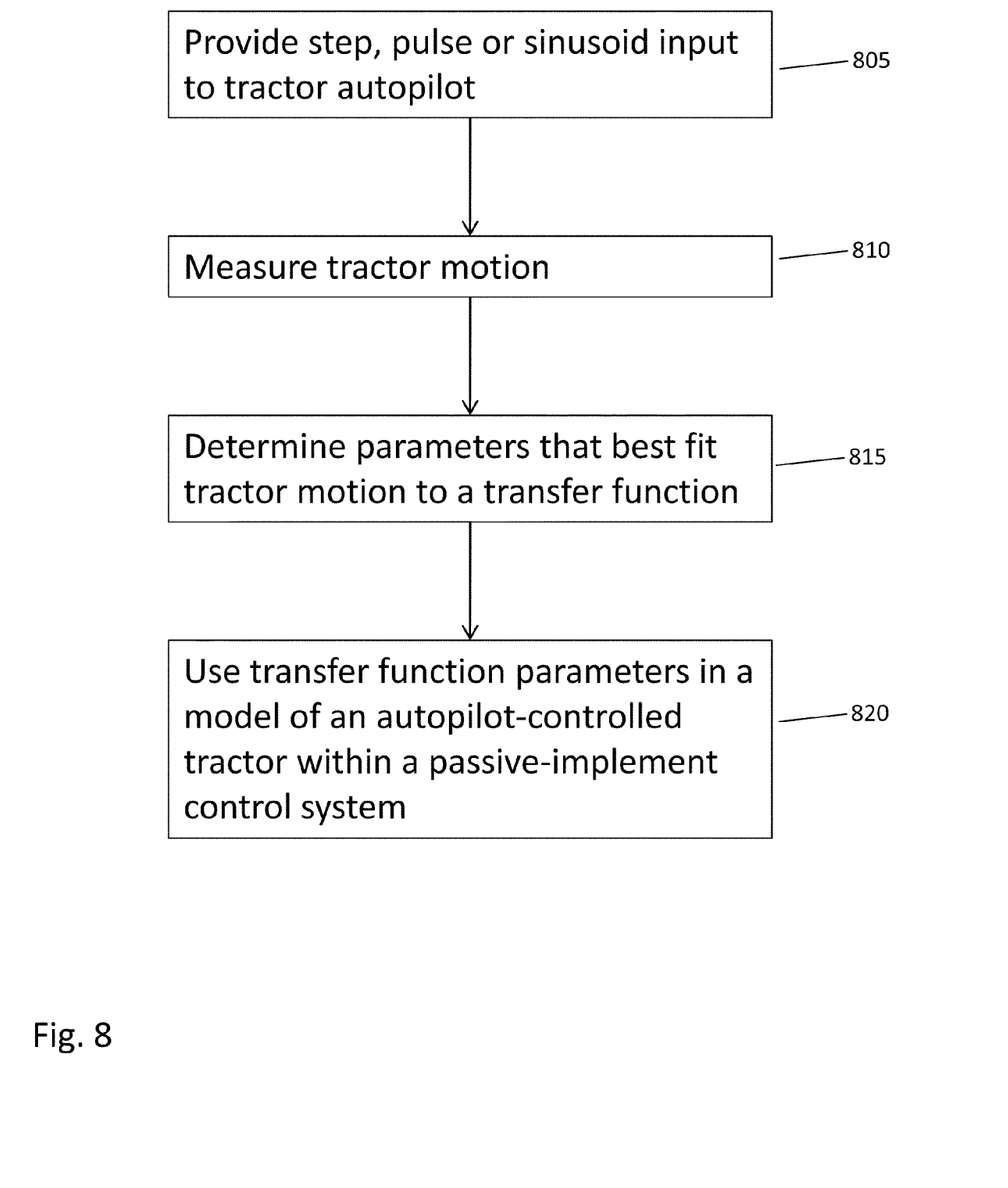
FIG. 8 is a flow chart for a method for guiding a passive implement.
Figure 9:
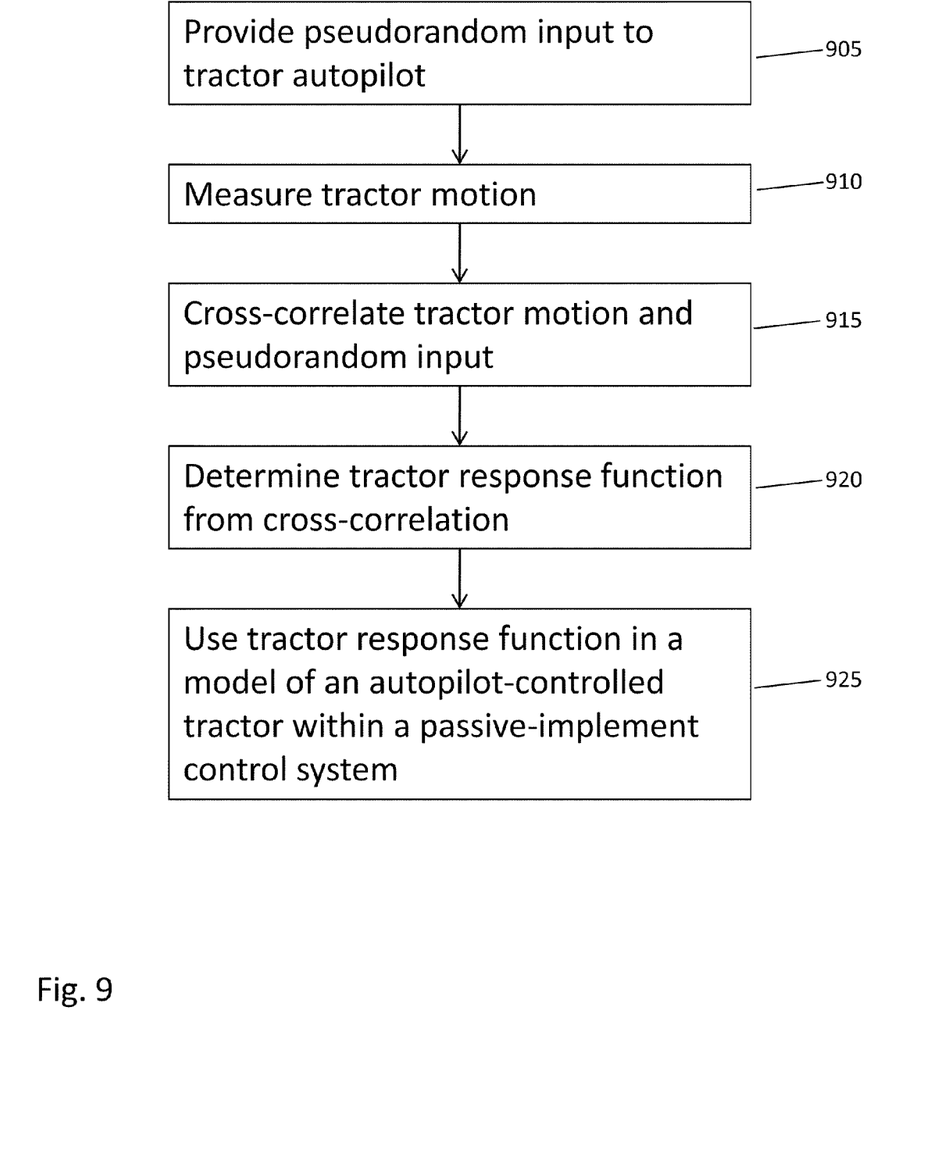
FIG. 9 is a flow chart for a method for guiding a passive implement.

There are many ways of characterizing the response of an autopilot-controlled tractor. FIG. 5 shows some examples of test inputs to a tractor autopilot while FIG. 6 illustrates a pulse input and a possible tractor response. FIGS. 7-9 are flow charts for methods of guiding a passive implement. The methods show how various ways of measuring autopilot-controlled tractor response may be combined with passive implement controls systems described above.

Characterizing the response of an autopilot-controlled tractor encompasses sending known, test inputs to the tractor and measuring the resulting tractor motion. The results may then be fit to a model. The model can then be used to predict tractor motion in response to future inputs. The process of constructing models from experimental data is known as system identification and is discussed in detail in, for example, Chapter 12 ("System Identification") of *Digital Control of Dynamic Systems*, 3rd edition, by G. F. Franklin, J. David Powell and Michael L. Workman (1998, Addison Wesley Longman, Menlo Park, Calif.), incorporated herein by reference, and Chapter 58 ("System Identification") of *The Control Handbook*, W. S. Levine, ed. (1996, CRC Press, Boca Raton, Fla.), incorporated herein by reference.

FIG. 5 illustrates examples of step, pulse, sinusoid and pseudorandOm inputs to a tractor autopilot. Step and short pulse inputs may be used to characterize the impulse response of a system, while sinusoidal inputs of varying frequencies are used in frequency response methods such as those of Nyquist, Bode or Nichols.

An example of a pseudorandom input is a long, possibly continuous, stream of very small pulses of random sign and amplitude. Low-level pseudorandom inputs cause tractor motions that are imperceptible to human operators, but that may be extracted from tractor motion data by cross correlation with the known input sequence.

FIG. 6A illustrates a pulse input to a tractor autopilot, while FIG. 6B illustrates the tractor response to the input of FIG. 6A. In FIG. 6A, pulse 605 is presented to a tractor autopilot. The resulting tractor response is plotted as curve 610 in FIG. 6B. The response may be characterized by one, two, or several parameters such as time constants and scale factors. Least squares or other methods may be used to find a set of parameters that minimizes the squared difference between measured and calculated tractor response at each point in a set of sample times.

FIG. 7 is a flow chart for a method for guiding a passive implement. The method outlined by FIG. 7 includes using a very simple tractor model in which the only parameter is the time required for the tractor to achieve half of a requested offset. In FIG. 7, step 705 is "Provide step-offset input to tractor autopilot". This step may be accomplished by using an offset input such as that shown in FIG. 2A, for example. Step 710 is "Measure time, $t_{1/2}$, required for tractor to achieve half the requested offset". Time, $t_{1/2}$, is illustrated in FIG. 2B. Finally, step 715 is "Use measured time, $t_{1/2}$, in a model of an autopilot-controlled tractor within a passive-implement control system", such as that described in connection with FIGS. 3 and 4.

FIG. 8 is a flow chart for a method for guiding a passive implement. The method outlined by FIG. 8 is more advanced than that of FIG. 7; however, the method of FIG. 7 is adequate in many practical situations. In FIG. 8, step 805 is "Provide step, pulse or sinusoid input to tractor autopilot", similar to the inputs shown in FIG. 5. Step 810 is "Measure tractor motion"; this is conveniently accomplished using a tractor-mounted GNSS receiver. Step 815 is "Determine parameters that best fit tractor motion to a transfer function". Once the form of a transfer function has been identified, parameters may be determined by least squares minimization or other optimization techniques. Finally, step 820 is "Use transfer function parameters in a model of an autopilot-controlled tractor within a passive-implement control system", such as that described in connection with FIGS. 3 and 4.

The methods associated with FIGS. 7 and 8 are conveniently executed as calibration procedures performed when a passive-implement control system is installed on a tractor and occasionally thereafter. In contrast, the method of FIG. 9 may be used to continuously track tractor response. The method of FIG. 9 may thus be part of a system that is constantly self-calibrating without the need for any action on the part of an operator, or it may be part of a system that automatically calibrates itself from time to time. The pseudorandom inputs used in the method of FIG. 9 are of such low amplitude that they are not noticeable to a tractor operator and do not affect his use of the tractor for agricultural work.

FIG. 9 is a flow chart for a method for guiding a passive implement. In FIG. 9, step 905 is "Provide pseudorandom input to tractor autopilot". A pseudo random input is drawn schematically in FIG. 5. The sequence for such an input may be generated by Gold codes, for example. Step 910 is "Measure tractor motion"; this is conveniently accomplished using a tractor-mounted GNSS receiver. Step 915 is "Cross-correlate tractor motion and pseudorandom input". Step 920 is "Determine tractor response function from cross-correlation". Finally, step 925 is "Use transfer function parameters in a model of an autopilot-controlled tractor within a passive-implement control system", such as that described in connection with FIGS. 3 and 4.

The advanced control system described here may include application-specific digital electronic circuits or software running in one or more general purpose digital processors. The software executes calculations required to model tractor motion, to evaluate the geometric relationships between the tractor, implement and hitch, and to implement a feedback control system.

In the descriptions above, the desired track has been represented as a series of straight lines; however, the desired track may also contain curves without affecting the design, principles of operation, or efficacy of the control system. In fact, the system improves curve tracking accuracy by directing a tractor to "cut" corners so that as an implement swings wide, it follows a desired path.

The control system for passive, towed implements described herein corrects implement path-tracking errors to zero consistently and optimally. It permits direct precision control of passive implements rather than the tractors that tow them.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for guiding a passive implement along a desired path comprising:
    providing a tractor guided by an autopilot having a nudge input;
    introducing a test input to the tractor autopilot;
    providing a GNSS receiver fixed to the passive implement;
    towing the passive implement behind the tractor via a hitch;
    using a model of the tractor-hitch-implement system to provide feedback to a control system that provides nudge inputs to the autopilot-controlled tractor and to the model; wherein,
        the model estimates the immediate passive implement offset from the path;
        tractor, hitch and implement elements within the model are arranged such that nudge inputs from the control system are applied to the implement element directly;
        the tractor element of the model includes information obtained from measurements of the motion of the tractor in response to the test input; and,
        the control system nudge inputs cause the difference between the actual implement path and the desired path to be minimized.

2. The method of claim 1 wherein the test input is a step offset and the information obtained from measurements of the motion of the tractor is the time, $t_{1/2}$, required for the tractor to achieve half the step offset.

3. The method of claim 1 wherein the test input is a step, a pulse, or a sinusoid and the information obtained from measurements of the motion of the tractor is a set of parameters that best fit the motion to a transfer function.

4. The method of claim 1 wherein the test input is a pseudorandom sequence and measurements of the motion of the tractor are cross-correlated with the pseudorandom sequence to determine a tractor response function.

5. The method of claim 1 wherein measurements of the motion of the tractor are obtained using a GNSS receiver fixed to the tractor.

6. The method of claim 1 wherein the hitch element of the model includes the distance from the hitch to the midpoint of the tractor's rear axle.

7. The method of claim 1 wherein the implement element of the model includes the distance from the implement's control point to the hitch.

8. The method of claim 1 wherein the GNSS receiver is a GPS receiver employing SBAS corrections.

9. The method of claim 8 wherein the SBAS corrections are obtained from the FAA WAAS.

10. The method of claim 1 wherein the GNSS receiver is a GPS receiver employing RTK positioning.

\* \* \* \* \*